United States Patent
Rhine et al.

(10) Patent No.: US 7,313,101 B2
(45) Date of Patent: Dec. 25, 2007

(54) NEED-BASED FILTERING FOR RAPID SELECTION OF DEVICES IN A TREE TOPOLOGY NETWORK

(75) Inventors: Scott Alan Rhine, Frisco, TX (US);
Sharad Singhal, Belmont, CA (US);
Xiaoyun Zhu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 10/327,335

(22) Filed: Dec. 20, 2002

(65) Prior Publication Data

US 2004/0120330 A1 Jun. 24, 2004

(51) Int. Cl.
*H04L 12/28* (2006.01)
(52) U.S. Cl. ............ 370/254; 370/256; 370/408; 709/221
(58) Field of Classification Search ............ None
See application file for complete search history.

(56) References Cited

U.S. PATENT DOCUMENTS

| 6,859,455 | B1 * | 2/2005 | Yazdani et al. ............ 370/392 |
| 2002/0059517 | A1 * | 5/2002 | Haviv et al. ............ 713/154 |
| 2002/0147800 | A1 | 10/2002 | Gai et al. | |
| 2003/0104829 | A1 | 6/2003 | Alzoubi et al. | |
| 2004/0120331 | A1 * | 6/2004 | Rhine et al. ............ 370/408 |

FOREIGN PATENT DOCUMENTS

EP 1333624 A3 8/2003

OTHER PUBLICATIONS

International Search Report, UK, Mailed Apr. 29, 2004.

* cited by examiner

*Primary Examiner*—Duc Ho

(57) ABSTRACT

A computer-implemented method for filtering, responsive to a logical specification of a network farm and a communication model for the farm, a tree topology network specification to obtain a filtered tree topology network specification is disclosed. The filtered tree topology network specification has fewer devices therein relative to the tree topology network specification, devices needed for constructing the farm being available in the filtered tree topology network specification. The method includes removing a first set of devices and a first set of switching elements from the tree topology network specification starting at the lowest level of the tree topology network specification and working toward the root node of the tree topology network specification. Each device in the first set of devices represents one of a redundant device, a device having a type unneeded by the farm, and a device unavailable for constructing the farm. Each switching element in the first set of switching elements represents a switching element whose children devices are all members of the first set of devices.

21 Claims, 15 Drawing Sheets

```
hub 1101
    rtr 2001
        15 n4000 cpus
            sw 8011 10 j6000 cpus
            sw 8021 10 j6000 cpus
            sw 8031 10 j6000 cpus
            sw 8061 10 j6000 cpus
    rtr 2002
        25 L3000 cpus
    rtr 2011
        10 a500 cpus
    rtr 2012
        10 a500 cpus
    rtr 2013
        10 a500 cpus
    rtr 2021
        10 lb
            sw 8041 12 lp1000r cpus
            sw 8051 12 lp1000r cpus
            sw 8045 12 lp1000r cpus
            sw 8081 12 lp2000r cpus
            sw 8001 12 lp2000r cpus
            sw 8135 12 lp2000r cpus
            sw 8991 8 fw
            sw 8981 8 fw
            sw 8971 8 fw
    rtr 2022
        10 lb
            sw 8042 12 lp1000r cpus
            sw 8052 12 lp1000r cpus
            sw 8046 12 lp1000r cpus
            sw 8082 12 lp2000r cpus
            sw 8083 12 lp2000r cpus
            sw 8084 12 lp2000r cpus
            sw 8992 8 fw
            sw 8982 8 fw
            sw 8972 8 fw
    rtr 2023
        10 lb
            sw 8043 12 lp1000r cpus
            sw 8053 12 lp1000r cpus
            sw 8055 12 lp1000r cpus
            sw 8085 12 lp2000r cpus
            sw 8003 12 lp2000r cpus
    rtr 2024
        10 lb
            sw 8044 12 lp1000r cpus
            sw 8054 12 lp1000r cpus
            sw 8004 12 lp2000r cpus
            sw 8005 12 lp2000r cpus
            sw 8006 12 lp2000r cpus
            sw 8100 6 backhauls
            sw 8101 4 nas, 2 backhauls
```

| FROM | backhaul | LP2000r | A500 | NAS |
|---|---|---|---|---|
| backhaul | 0 | 7.7 | 0 | 0 |
| LP2000r | 7.7 | 0 | 7.1 | 5.1 |
| A500 | 0 | 7.1 | 0 | 7.1 |
| NAS | 0 | 5.1 | 7.1 | 0 |

Communication between individual devices (in Mbps)

FIG. 2B

```
hub 1101
    rtr 2011
        10 a500 cpus
    rtr 2012
        10 a500 cpus
    rtr 2013
        10 a500 cpus
    rtr 2021
        sw 8081 12 lp2000r cpus
        sw 8001 12 lp2000r cpus
        sw 8135 12 lp2000r cpus
    rtr 2022
        sw 8082 12 lp2000r cpus
        sw 8083 12 lp2000r cpus
        sw 8084 12 lp2000r cpus
    rtr 2023
        sw 8085 12 lp2000r cpus
        sw 8003 12 lp2000r cpus
    rtr 2024
        sw 8004 12 lp2000r cpus
        sw 8005 12 lp2000r cpus
        sw 8006 12 lp2000r cpus
        sw 8100  6 backhauls
        sw 8101  4 nas, 2 backhauls
```

FIG. 5

```
hub 1101  (can supply 13 lp2000r, 2 a500s, 1 nas, 1 backhaul)
   rtr 2011
      2 a500 cpus
   rtr 2012
      2 a500 cpus
   rtr 2013
      2 a500 cpus
   rtr 2021 (13 lp2000r)
      sw 8081  12 lp2000r cpus
      sw 8001  12 lp2000r cpus
      sw 8135  12 lp2000r cpus
   rtr 2022 (13 lp2000r)
      sw 8082  12 lp2000r cpus
      sw 8083  12 lp2000r cpus
      sw 8084  12 lp2000r cpus
   rtr 2023 (13 lp2000r)
      sw 8085  12 lp2000r cpus
      sw 8003  12 lp2000r cpus
   rtr 2024 (13 lp2000r, 1 nas, 1 backhaul)
      sw 8004  12 lp2000r cpus
      sw 8005  12 lp2000r cpus
      sw 8006  12 lp2000r cpus
      sw 8100  1 backhauls
      sw 8101  1 nas, 1 backhauls
```

FIG. 7 hub 1101 (can supply 13 lp2000r, 2 a500s, 1 nas, 1 backhaul)
    rtr 2011
     2 a500 cpus
    rtr 2012
     2 a500 cpus
    rtr 2013
     2 a500 cpus
    rtr 2021 (13 lp2000r)
      sw 8081' 13 lp2000r cpus
    rtr 2022 (13 lp2000r)
      sw 8082' 13 lp2000r cpus
    rtr 2023 (13 lp2000r)
      sw 8085' 13 lp2000r cpus
    rtr 2024 (13 lp2000r, 1 nas, 1 backhaul)
      sw 8004' 13 lp2000r cpus
      sw 8101 1 nas, 1 backhauls

FIG. 10 hub 1101 (can supply 13 lp2000r, 2 a500s, 1 nas, 1 backhaul)
    rtr 2011
      2 a500 cpus
    rtr 2024 (13 lp2000r, 1 nas, 1 backhaul)
      sw 8004' 13 lp2000r cpus
      sw 8101 1 nas, 1 backhaul

FIG. 12

NEED-BASED FILTERING FOR RAPID SELECTION OF DEVICES IN A TREE TOPOLOGY NETWORK

BACKGROUND OF THE INVENTION

Computer networks are pervasive these days. In a typical computer network, various devices of different types are interconnected via switching elements, such as rooters, switches, and hubs, to allow the devices to communicate among one another according to a predefined communication model.

There are various ways in which networks can be configured into topologies required by applications using those networks. The simplest network tends to involve hardwiring the various devices together using appropriate switching elements and interconnecting media (e.g., conductive cables, fiber optic cables, the wireless medium, etc.). Although the hardwire approach works well for relatively small, static network configurations, it does not scale well and tends to result in networks that are difficult to manage and upgrade.

Recently, there has been proposed a more flexible approach to building computer networks. Instead of constructing each network topology piecemeal by hardwiring the devices together, the devices are viewed as belonging to a common pool of resources, which are disposed in a hierarchical tree topology. A hierarchical tree topology is selected since devices in the tree communicate among themselves along deterministic communication paths, thereby simplifying the provisioning and upgrade tasks. Within the hierarchical tree topology, the devices are interconnected using a pool of switching elements. Depending on how the switching elements are configured, various logical networks can be constructed from this common pool of devices and switching elements (e.g., switches, rooters, and hubs) using, for example, a virtual local area network (VLAN) technology. A discussion of one exemplary VLAN technology may be obtained from the IEEE 802.1Q working group (http://grouper.ieee.org/groups/802/1/, September 2002)

Under this approach, any number of logical network topologies can be constructed from the physical network if there are sufficient resources in the common pool of devices and switching elements (e.g., switches, rooters, and hubs) of the tree. For example, an organization wishes to create or upgrade to a three-tier application topology having two database servers, five application servers, four web servers, and a firewall for Internet access. From this specification and the communication model, which governs the communication policy (including the expected bandwidth usage) for each device required for the application, the necessary devices (e.g., database servers, application servers, web servers, and firewalls) may be picked from the common pool of devices and interconnected using the switching elements in the tree. Thus, the construction of a logical network topology becomes an exercise in picking the required devices from the pool of available devices existing in the tree hierarchy and to configure the switching elements appropriately to interconnect the devices as specified by the communication model and the logical specification. Such a network (containing a variety of devices and network elements so that they comply with a given communication model) is herein referred to as a "farm."

To facilitate discussion, FIG. 1 illustrates an exemplary data center 100, representing the large common pool of almost 500 networked devices of ten different types and switching elements from which various farms can be constructed. Data center 100 includes a hub 1101 (containing 8 network ports for a total of 4096 Mbps) at the root level of the hierarchical tree. Hub 1101 is coupled with nine rooters 2001, 2002, 2011, 2012, 2013, 2021, 2022, 2023, and 2024, which are disposed at level 1 of the tree (with the hub being level 0).

Router 2001 is coupled with 15 N4000 N-class servers (servers are denoted by the term "cpu" in FIG. 1) and four switches: 8011, 8021, 8031, and 8061, which are disposed at level 2 of the tree. Each of switches 8011, 8021, 8031, and 8061 is coupled to 10 J6000 servers, which are disposed at level 3 of the tree.

Router 2002 is coupled to 25 L3000 servers, which are disposed at level 2 of the tree. As shown in FIG. 1, each of rooters 2011, 2012, and 2013 is coupled to 10 A500 servers, which are disposed at level 2 of the tree.

Router 2021 is coupled to 10 load balancers (1b) and nine switches: 8041, 8051, 8045, 8081, 8001, 8135, 8991, 8981, and 8971, which are disposed at level 2 of the tree. Each of switches 8041, 8051, and 8045 is coupled to 12 LP1000R servers. Each of switches 8081, 8001, and 8135 is coupled to 12 LP2000R servers. Each of switches 8991, 8981, and 8971 is coupled to 8 firewalls. The LP1000R servers, the LP2000R servers, and the firewalls associated with router 2021 are disposed at level 3 of the tree.

Router 2022 is coupled to 10 load balancers (1b) and nine switches: 8042, 8052, 8046, 8082, 8083, 8084, 8992, 8982, and 8972, which are disposed at level 2 of the tree. Each of switches 8042, 8052 and 8046 is coupled to 12 LP1000R servers. Each of switches 8082, 8083 and 8084 is coupled to 12 LP2000R servers. Each of switches 8992, 8982 and 8972 is coupled to 8 firewalls. The LP1000R servers, the LP2000R servers, and the firewalls associated with router 2022 are disposed at level 3 of the tree.

Router 2023 is coupled to 10 load balancers (1b) and five switches: 8043, 8053, 8055, 8085, and 8003, which are disposed at level 2 of the tree. Each of switches 8043, 8053 and 8055 is coupled to 12 LP1000R servers. Each of switches 8085 and 8003 is coupled to 12 LP2000R servers. The LP1000R servers and the LP2000R servers associated with router 2023 are disposed at level 3 of the tree.

Router 2024 is coupled to 10 load balancers (1b) and seven switches: 8044, 8054, 8004, 8005, 8006, 8100 and 8101, which are disposed at level 2 of the tree. Each of switches 8044 and 8054 is coupled to 12 LP 1000R servers. Each of switches 8004, 8005 and 8006 is coupled to 12 LP2000R servers. Switch 8100 is coupled to 6 Virtual Private Network (VPN) gateways (denoted as backhauls in FIG. 1). Switch 8101 is coupled to 4 Network Attached Storage (NAS) facilities and 2 VPN gateways. The LP1000R servers, the LP2000R servers, and the NAS and the VPN gateways associated with router 2024 are disposed at level 3 of the tree.

Suppose one wishes to build a farm from a logical specification that specifies a three-tier architecture having two A500 database servers, one NAS, a cluster of 13 LP2000R application servers, and a VPN gateway (backhaul) from the data center 100 of FIG. 1. Furthermore, the LP2000R application servers do not communicate among one another, nor do the A500 database servers communicate between themselves. The logical specification of this farm is shown in FIG. 2A. The communication model is shown in FIG. 2B. Assuming all the devices in data center 100 are available for use, there is more than sufficient resource in data center 100 to construct the required farm.

If efficiency is not a concern, the farm may be constructed by randomly picking the devices (e.g., the database servers, the LP2000R application servers, and the firewall) from the available devices in the data center 100, and appropriately configuring the switching elements that are disposed along their possible communication paths. However, such a random approach does not optimize the bandwidth usage in data center 100 and may require data among the devices of the farm to traverse more hops than necessary. Consider the communication between a VPN gateway and an LP2000R application server, for example. If both the VPN gateway and the LP2000R application server are picked from those under router 2024, such as under a VPN gateway under switch 8101 and a LP2000R server under switch 8004, the communication between that VPN gateway and the LP2000R server requires only four hops (via switch 8101, router 2024, and switch 8004). On the other hand, if the VPN gateway is picked from those under switch 8100 of router 2024 and the LP2000R server is picked from those under switch 8083 of router 2022, the communication between that VPN gateway and the LP2000R server requires six hops (via switch 8100, router 2024, hub 1101, router 2022, switch 8083). The random approach does not take bandwidth capacity or congestion into consideration when picking the constituent devices.

Another approach known as first-come-first-served (FCFS) dictates that one may traverse the tree in a given direction and gather as much of the resources along the way as possible until all resource requirements are satisfied. Under this approach, the aforementioned farm may be constructed, for example, using resources encountered when traversing through router 2001, its child nodes and its grandchild nodes, and then through router 2002, its child nodes and its grandchild nodes, stopping along the way if and when the required resources are all obtained. Like the random approach, there is little intelligence in the selection of the constituent devices of the farm with respect to bandwidth efficiency. Accordingly, farms constructed using the first-come-first-served paradigm for device selection may also result in bandwidth inefficiency and performance degradation.

The most efficient set of constituent devices to build a farm from a tree topology network may be obtained after evaluating all possible permutations and selecting the most bandwidth efficient permutation. This approach is however impractical for most tree topology networks of any significant size (e.g., having more than 100 devices). Beyond a certain size, the sheer number of devices present in the tree topology network gives rise to an enormous set of possible permutations, which requires a correspondingly enormous amount of computing power and time to evaluate.

Some intelligent device selection algorithms may be employed to reduce the amount of time required to select an efficient set of constituent devices to build a farm. Even though these intelligent device selection algorithms do not require an exhaustive evaluation of all possible combinations in the tree topology network, the amount of time required to come up with a solution nevertheless scales with increasing complexity of the tree network topology. If the tree topology network can be intelligently simplified prior to device selection, these device selection algorithms may work even more efficiently, or may not be required at all to come up with an efficient solution.

SUMMARY OF THE INVENTION

The invention relates, in one embodiment, to a computer-implemented method for filtering, responsive to a logical specification of a network farm and a communication model for the farm, a tree topology network specification to obtain a filtered tree topology network specification. The filtered tree topology network specification has fewer devices therein relative to the tree topology network specification, devices needed for constructing the farm being available in the filtered tree topology network specification. The method includes removing a first set of devices and a first set of switching elements from the tree topology network specification starting at the lowest level of the tree topology network specification and working toward the root node of the tree topology network specification. Each device in the first set of devices represents one of a redundant device, a device having a type unneeded by the farm, and a device unavailable for constructing the farm. Each switching element in the first set of switching elements represents a switching element whose children devices are all members of the first set of devices.

In another embodiment, the invention relates to an article of manufacture comprising a program storage medium having computer readable codes embodied therein, the computer readable codes being configured for filtering, responsive to a logical specification of a network farm and a communication model for the farm, a tree topology network specification to obtain a filtered tree topology network specification. The filtered tree topology network specification has fewer devices therein relative to the tree topology network specification. Devices needed for constructing the farm are available in the filtered tree topology network specification. There are included computer readable codes for removing a first set of devices and a first set of switching elements from the tree topology network specification starting at the lowest level of the tree topology network specification and working toward the root node of the tree topology network specification. Each device in the first set of devices represents one of a redundant device, a device having a type unneeded by the farm, and a device unavailable for constructing the farm. Each switching element in the first set of switching elements represents a switching element whose children devices are all members of the first set of devices.

In yet another embodiment, the invention relates to a computer-implemented method for filtering, responsive to a logical specification of a network farm and a communication model for the farm, a tree topology network specification to obtain a filtered tree topology network specification. The filtered tree topology network specification has fewer devices therein relative to the tree topology network specification. Devices needed for constructing the farm are available in the filtered tree topology network specification. The method includes performing filter-by-device on the tree topology network specification to prune, at the lowest level of the tree topology network specification, a first set of devices, each device in the first set of devices representing one of device having a type unneeded by the farm and a device unavailable for constructing the farm, thereby obtaining a post-filter-by-device tree topology network specification. The method further includes performing filter-by-switching-element on switching elements of the post-filter-by-device tree topology network specification to prune at each switching element of the post-filter-by-device tree topology network specification direct connect redundant devices, thereby obtaining a post-filter-by-switching-element tree topology network specification, at least one switching element representing one of a switch, a router, and a hub. The method also includes performing filter-by-router on rooters of the post-filter-by-switching-element tree topology network specification to prune at each router of the post-filter-by-switching-element tree topology network specification redundant switches, thereby obtaining a post-filter-by-router tree topology network specification. The method additionally includes performing filter-by-hub on a hub of the post-filter-by-router tree topology network specification to prune redundant rooters, thereby obtaining the filtered tree topology network specification.

In still another embodiment, the invention relates to an arrangement for creating a network farm that conforms to a furnished logical specification and a furnished communication model for the farm, the logical specification specifying types of device required by the farm and a number of devices of each of the types of device required by the farm, the communication model specifying bandwidth utilization of each type of device in the farm. The arrangement includes a tree topology network having therein devices and switching elements arranged in a tree topology. The arrangement further includes a computer apparatus executing computer-readable codes for filtering, responsive to the logical specification and the communication model for the farm, a tree topology network specification of the tree topology network to obtain a filtered tree topology network specification. The filtered tree topology network specification has fewer devices therein relative to the tree topology network specification. Devices needed for constructing the farm being available in the filtered tree topology network specification. Computer readable codes for the filtering includes computer readable codes for removing a first set of devices and a first set of switching elements from the tree topology network specification starting at the lowest level of the tree topology network specification and working toward the root node of the tree topology network specification. Each device in the first set of devices represents one of a redundant device, a device having a type unneeded by the farm, and a device unavailable for constructing the farm. Each switching element in the first set of switching elements represents a switching element whose children devices are all members of the first set of devices.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an exemplary data center, representing the large common pool of networked devices of different types and switching elements from which various farms can be constructed.

FIG. 2B illustrates an exemplary communication model for a farm.

FIG. 5 shows the exemplary OVERLAY tree after the filtering process of FIG. 4 is completed on the tree network of FIG. 1.

FIG. 7 shows the exemplary OVERLAY tree after the completion of the filter-by-switching-element process of FIG. 6.

FIG. 10 shows the exemplary OVERLAY tree after the completion of the filter-by-router process of FIGS. 8A, 8B and 9.

FIG. 12 shows the exemplary OVERLAY tree after the completion of the filter-by-hub process of FIGS. 11A and 11B.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided a filtering technique for reducing the number of devices and the number of switching elements (i.e., the hubs, rooters, or switches) in the tree topology network prior to device selection. The filtering technique takes into account the farm needs, the bandwidth requirement of the devices, the bandwidth of the switching elements through which one or more devices communicate, to remove redundant devices and switching elements from the tree topology network. Advantageously, the filtered tree topology network (FTTN) has all resources required by the farm and the best solution available with the FTTN is substantially as efficient as the best solution available with the unfiltered TTN (UTTN). In this manner, the problem set is reduced and fewer permutations need to be evaluated in order to come up with an efficient solution.

Figure 3:
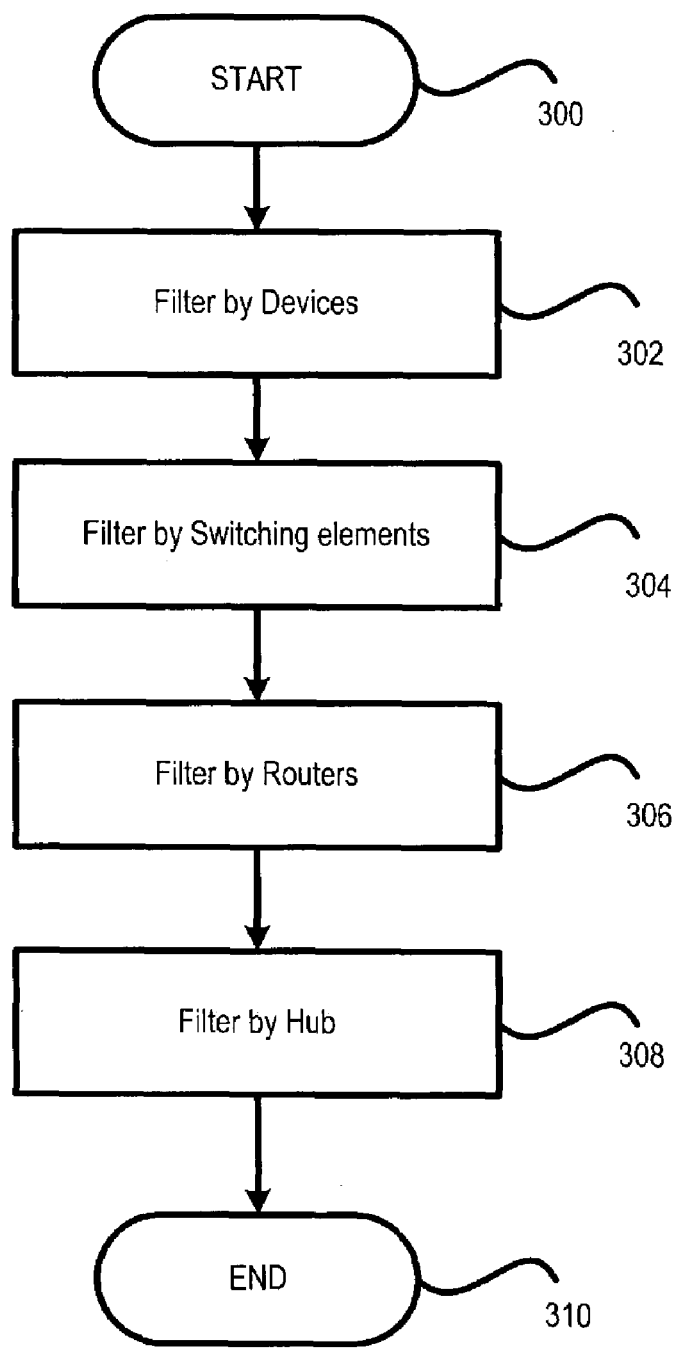
FIG. 3 illustrates, in accordance with one embodiment of the present invention, the need-based filtering algorithm FIG. 4 herein discusses one embodiment of the filter-by-device process in greater detail.
Figure 4:
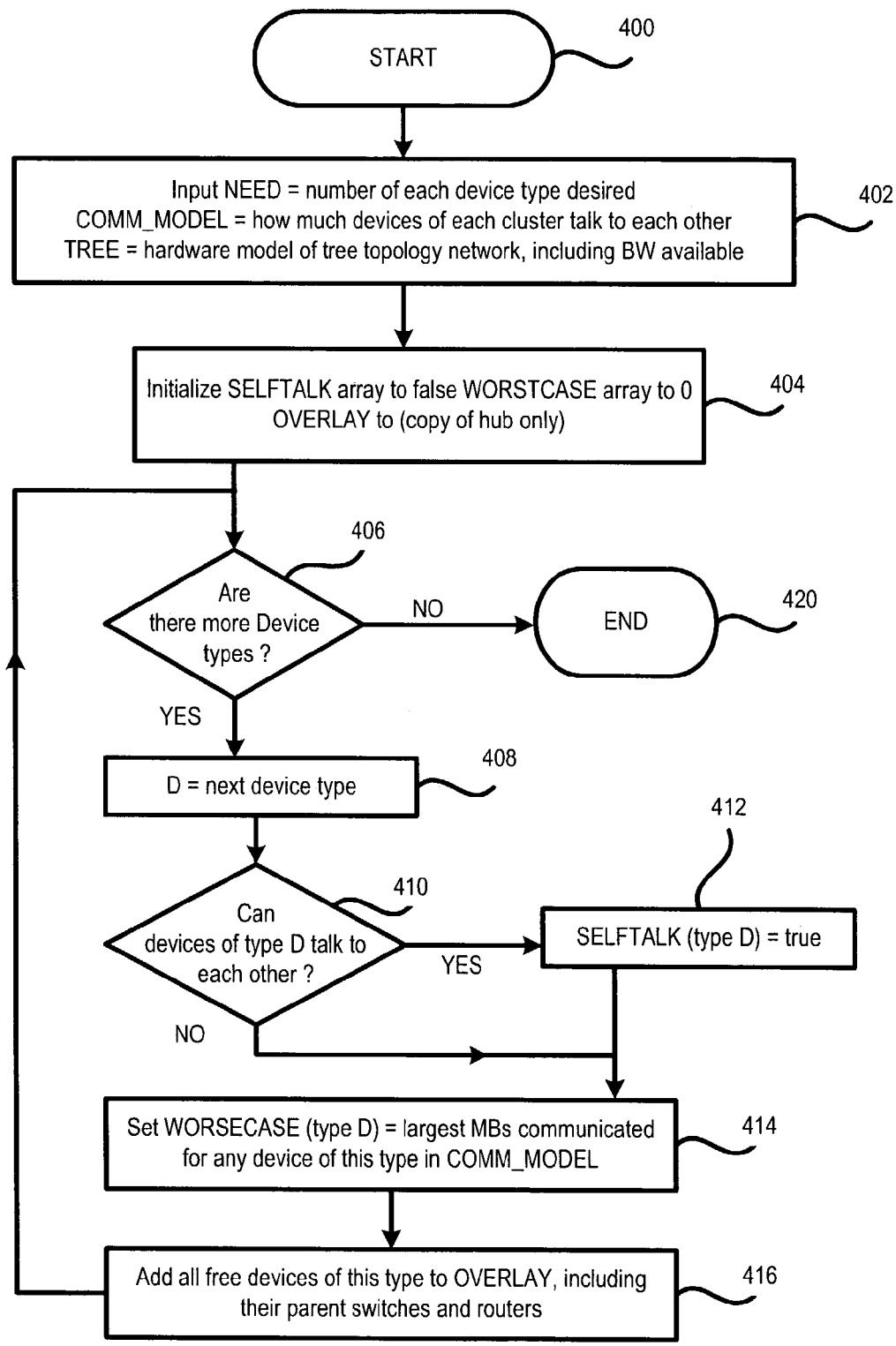

FIG. 3 illustrates, in accordance with one embodiment of the present invention, the need-based filtering algorithm. At a high level, the filtering algorithm involves filtering the topology tree network, or a copy thereof, from the bottom up and pruning as the filtering progresses. Accordingly, in block 302, the devices are filtered to remove devices of unneeded types. Generally speaking, for each device type, two parameters are kept: 1) SELFTALK, which indicates whether devices of a particular device type can talk among one another, and 2) WORSTCASE bandwidth, which represents the worst-case bandwidth requirement for a particular type of device. FIG. 4 herein discusses one embodiment of the filter-by-device process in greater detail.

Figure 6:
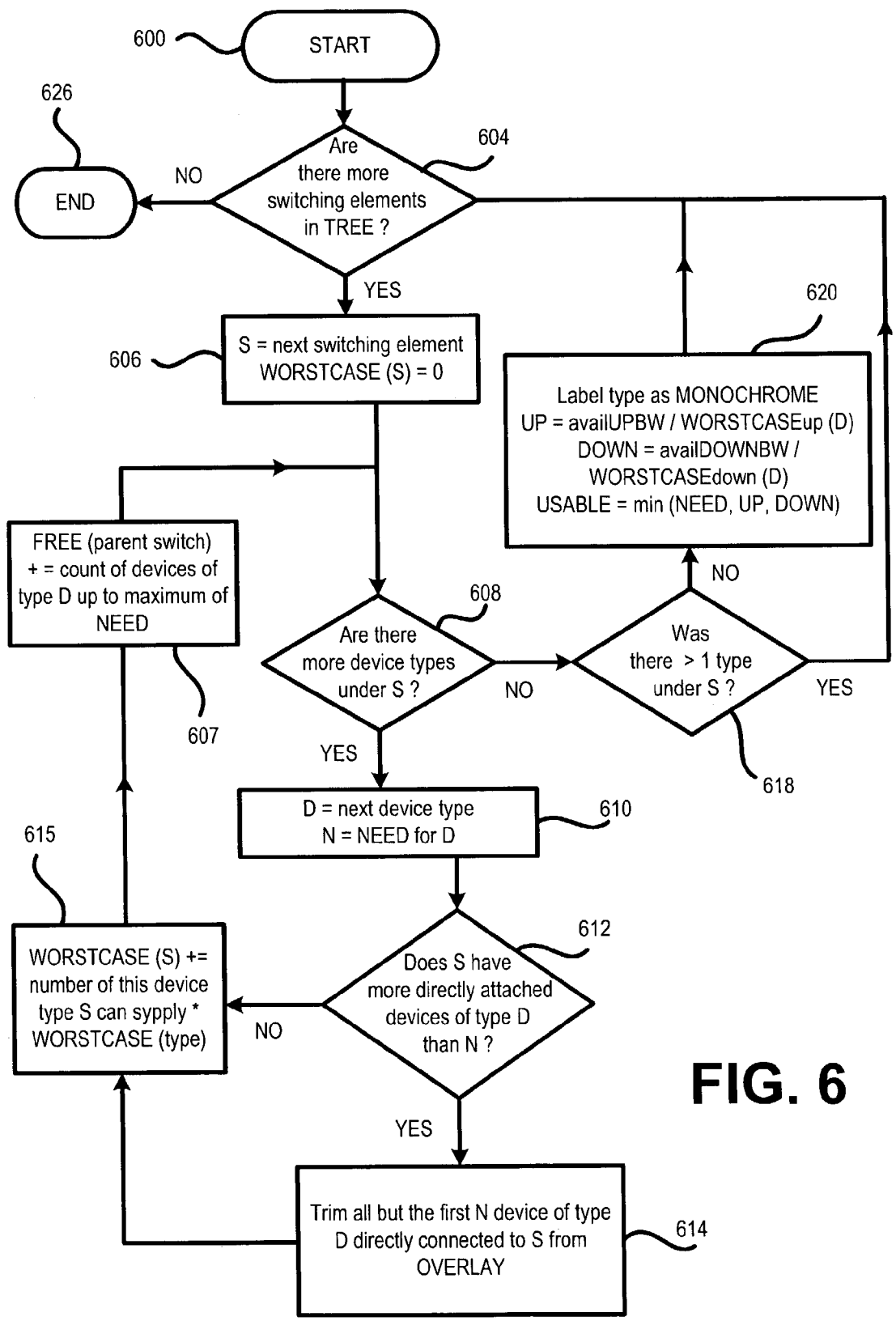
FIG. 6 illustrates, in accordance with one embodiment of the present invention, the filter-by-switching-element process.

In block 304, the filtering is performed at each of the switching element (switch, router, and hub) levels. Generally speaking, at this stage, the unneeded devices have already been removed earlier in block 302, and the filtering-by-switching-element process of block 304 involves removing redundant direct connect devices from the switching elements. FIG. 6 herein discusses one embodiment of the filter-by-switching-element process in greater detail.

Figure 8A:
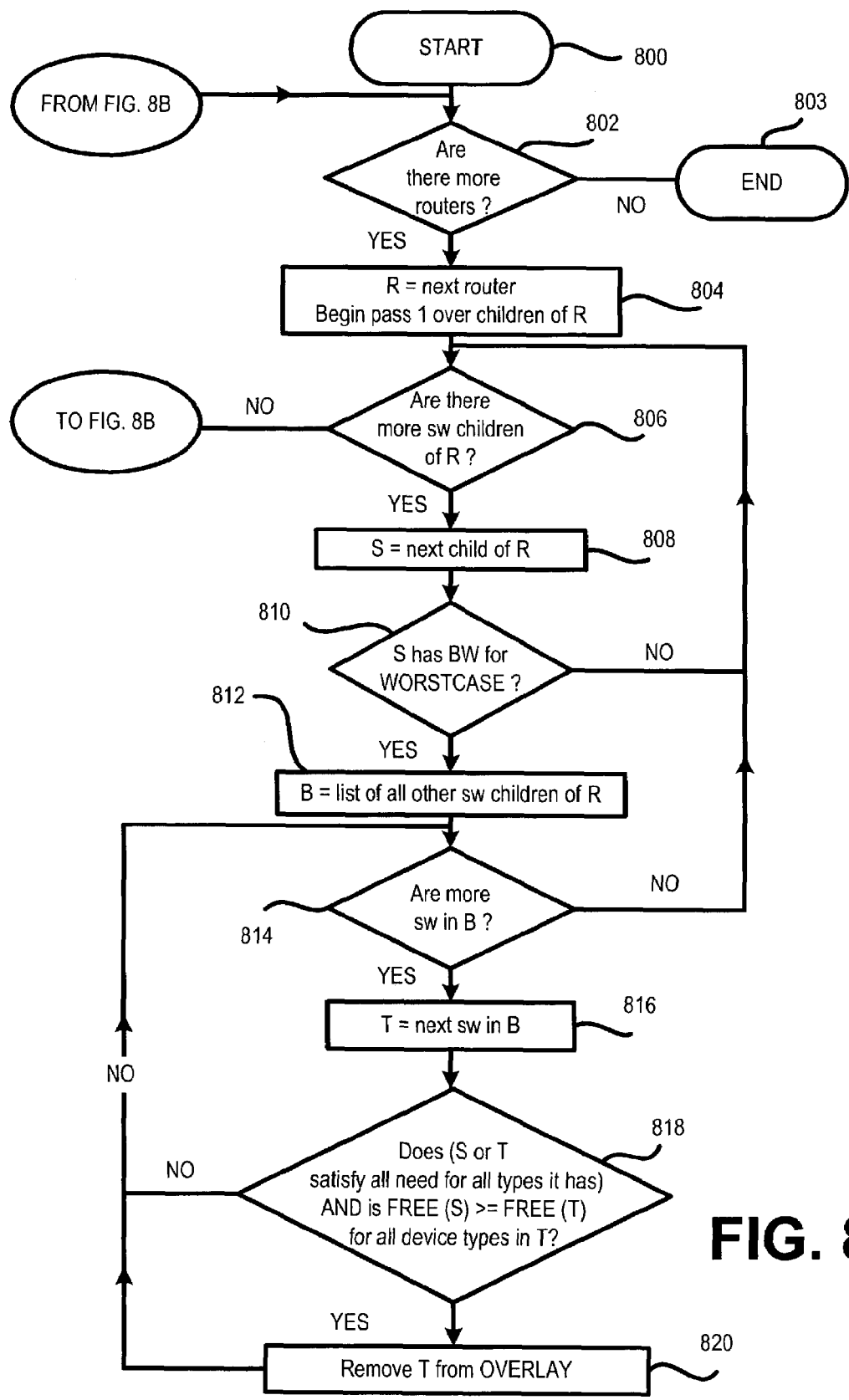
FIGS. 8A and 8B show, in accordance with one embodiment of the present invention, the filter-by-router process.
Figure 8B:
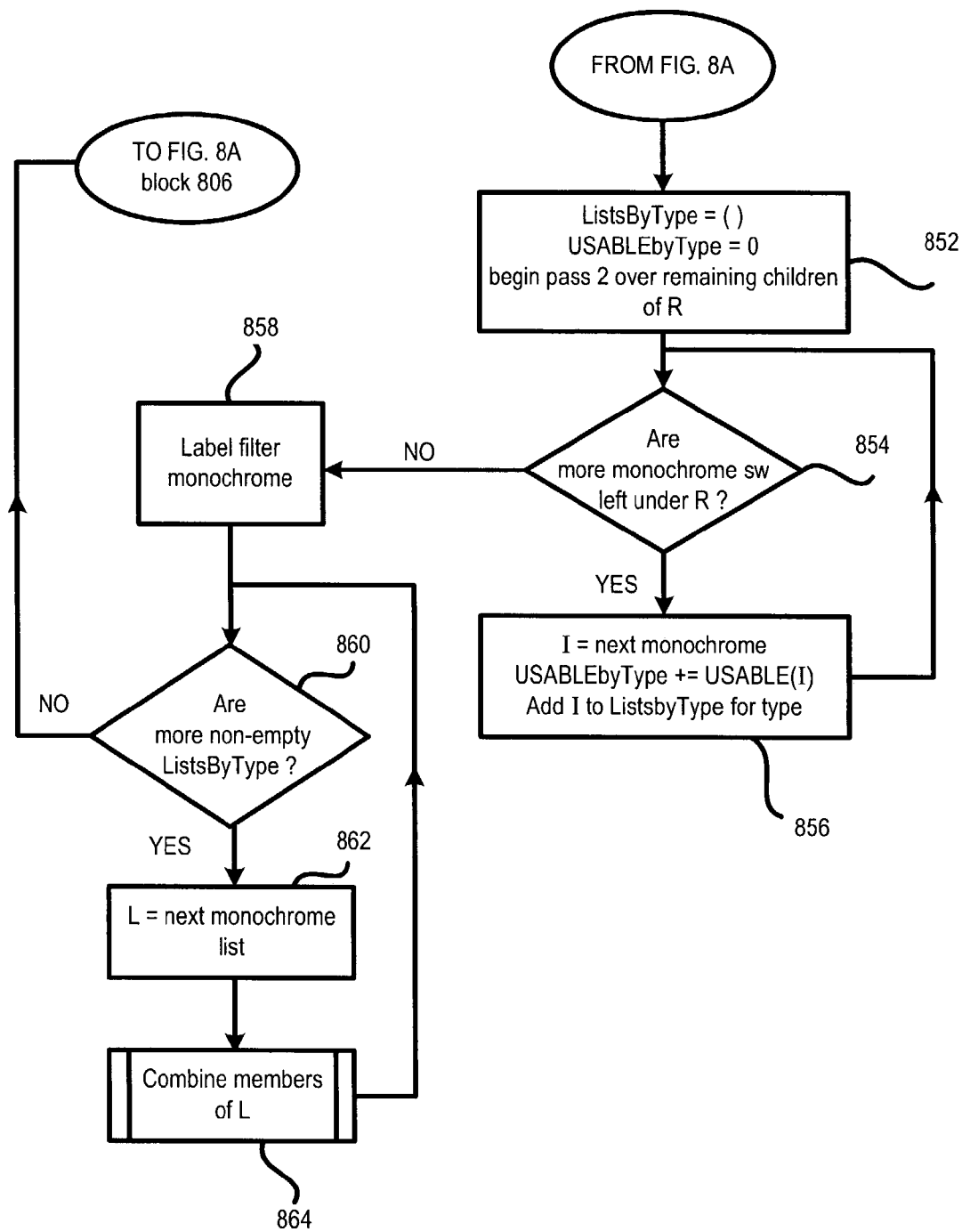
Figure 9:
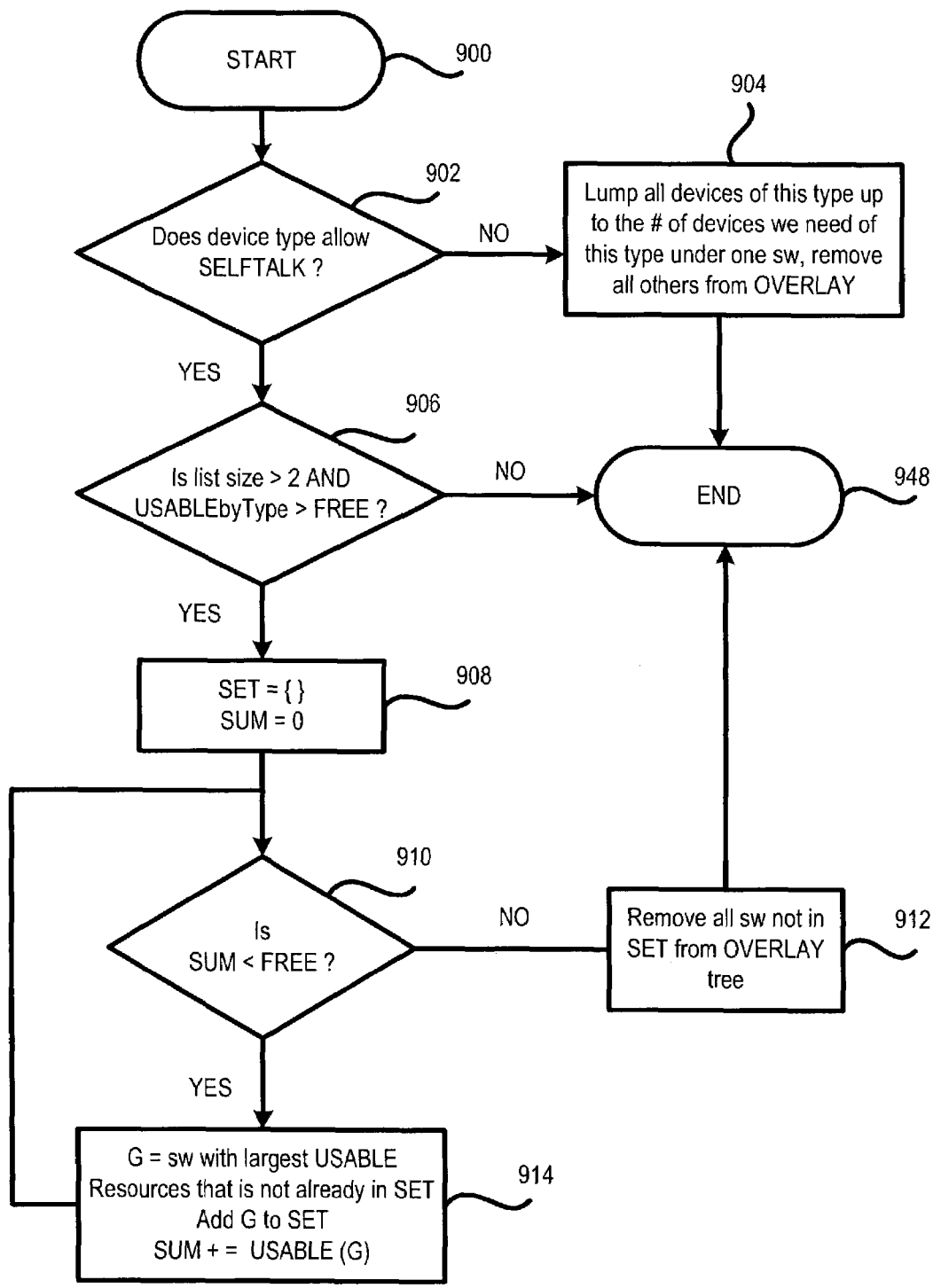
FIG. 9 illustrates, in accordance with one embodiment of the present invention, the COMBINE process called by FIG. 8B.

In block 306, filtering is performed at the router level. Generally speaking, redundant switches are eliminated in this process. Furthermore, switches are "combined" in order to fulfill the needs of the farm with respect to a particular device type if it is advantageous to do so. FIGS. 8A, 8B, and 9 herein discuss one embodiment of the filter-by-router process in greater detail.

In block 308, filtering is performed at the hub level. Generally speaking, redundant rooters are eliminated in this process. FIG. 11 herein discusses one embodiment of the filter-by-hub process in greater detail.

There are additional complexities, nuances, and optimizations in each of the blocks of FIG. 3, which may be better understood with reference to the figures that follow.

FIG. 4 illustrates, in accordance with one embodiment of the present invention, the filter-by-device process of block 302 in FIG. 3. In block 402, the number of each device type desired by the farm, the communication model, and the hardware model of the tree topology network, including bandwidth available, are received. In block 404, the array SELFTALK, elements of which are employed to track whether devices of the same given type of device can communicate among themselves, is initialized to false. Array WORSTCASE, elements of which are employed to track the worst-case bandwidth for each device type, is initialized to 0. An overlay image (e.g., a copy) of the hub of tree topology network is also made in 404 to facilitate the filter operation, which works on the OVERLAY tree.

In block 406, it is ascertained whether there are additional device types to process. If there are additional device types to process, the method proceeds to block 408 wherein the temporary variable D is set to be the next device type. In block 410, a simple check is made against the communication model provided in block 402 to determine whether devices of type D can talk to each other. If devices of type D can talk to each other, the corresponding array element of array SELFTALK is set to true in block 412 to reflect this characteristic.

In block 414, the array element of array WORSTCASE employed to track the worst case bandwidth requirement of device type D is set to the largest bandwidth requirement indicated by the communication model for device type D. In block 416, all free devices of type D, including their parent switches and rooters, are added to OVERLAY. The effect of block 416 is to add only those devices from the tree network that are free and have types required for the farm to the OVERLAY. This eliminates all devices not required by the farm or those devices that are not free from consideration in the search.

Thereafter, the method returns to block 406 to process the next device type. The process will continue until all device types are processed, in which case the method ends in block 420.

FIG. 5 shows the OVERLAY tree after the filtering process of FIG. 4 is completed on the tree network of FIG. 1. In the present example, it is assumed that all devices shown in original FIG. 1 are free and are available for use in constructing the farm. Compared to the original tree topology network of FIG. 1, the unneeded devices have been eliminated. For example, with reference to router 2001 and router 2002, these rooters do not have any device required by the farm. Since these unneeded devices were not added to the OVERLAY tree by block 416 and are consequently absent from FIG. 5, their parent switches and rooters are also not added to the OVERLAY tree. Router 2011, 2012, 2013 all have 10 a500 servers apiece. In the present example, these a500 servers are required and all are therefore added to the OVERLAY tree. Their parent switches and rooters are also added, as can be seen in FIG. 5.

With reference to router 2021, the load balancers, the LP1000R servers, and firewalls shown in FIG. 1 are not needed and thus have not been added to the OVERLAY tree. However, the LP2000R servers are required by the farm and have consequently been added to the OVERLAY tree. Their parent switches and rooters are also added, as can be seen in FIG. 5.

FIG. 6 illustrates, in accordance with one embodiment of the present invention, the process of block 304 in FIG. 3. In block 604, it is ascertained if there are any additional switching elements in the OVERLAY tree. If there are additional switching elements to be processed, the method proceeds to block 606 wherein the temporary variable S is set to the next switching element and the WORSTCASE for this switching element represented by S is set to 0. In block 608, it is ascertained whether there are more device types under switching element S to process. If there are, the method proceeds to block 610 to set the temporary variable D to the next device type and the temporary variable N to the need for device type D (which need is obtained from the logical specification).

In block 612, it is ascertained whether switching element S has more direct connect devices of type D than the need represented by the temporary variable N. If switching element S has more direct connect devices of type D than the need represented by the temporary variable N, all the excess devices of type D are trimmed from the OVERLAY tree in block 614. The effect of block 614 therefore is to remove redundant direct connect devices from the switching element.

In block 615, the element of the WORSTCASE array for tracking the worst case bandwidth for switching element S is set to be equal to the currently existing value of this element of the WORSTCASE array and the number of this device type D remaining connected to that switching element S in the OVERLAY multiplied by the worst case bandwidth for this device type (which was tracked by WORSTCASE (type) in block 414 of FIG. 4). Preferably, the worst case scenarios for both directions are tracked for switching element S (i.e., up direction through switching element S and down direction through switching element S separately). This condition is used to track the maximum bandwidth that could flow through the switching element from devices of type D connected to it. In addition, the variable FREE associated with the parent switching element (e.g., router 2022 when switch 8082 is being considered) is incremented by the number of devices of type D (up to a maximum of NEED) in block 607.

Thereafter the process returns to block 608 to process the next device type under switching element S. If all device types under switching element S have been processed, the method proceeds from block 608 to block 618 to check if switching element S has more than one device type (block 618). If switching element S has only one device type, the process proceeds to block 620 wherein switching element S is labeled MONOCHROME, and the following variables are set.

UP=availUPBW/WORSTCASEup (D)
DOWN=availDOWNBW/WORSTCASEdown (D)
USABLE=min (NEED, UP, DOWN)

The variable UP tracks the number of devices type D that a MONOCHROME switching element S can support given the available up bandwidth for switching element S and the worst case bandwidth requirement in the up direction for a device of type D. The variable DOWN tracks the number of devices type D that a MONOCHROME switching element S can support given the available down bandwidth for switching element S and the worst case bandwidth requirement in the down direction for a device of type D. The variable USABLE tracks the maximum number of devices of type D that the MONOCHROME switching element can support. The process then proceeds to block 604 to check if more switching-elements are present. If in block 618, there are more than one type of device, the switch cannot be labeled MONOCHROME and the process proceeds directly to block 604.

On the other hand, if in block 604, it is ascertained that there are no more switching elements in the OVERLAY tree, the process ends at block 626.

Figure 2A:
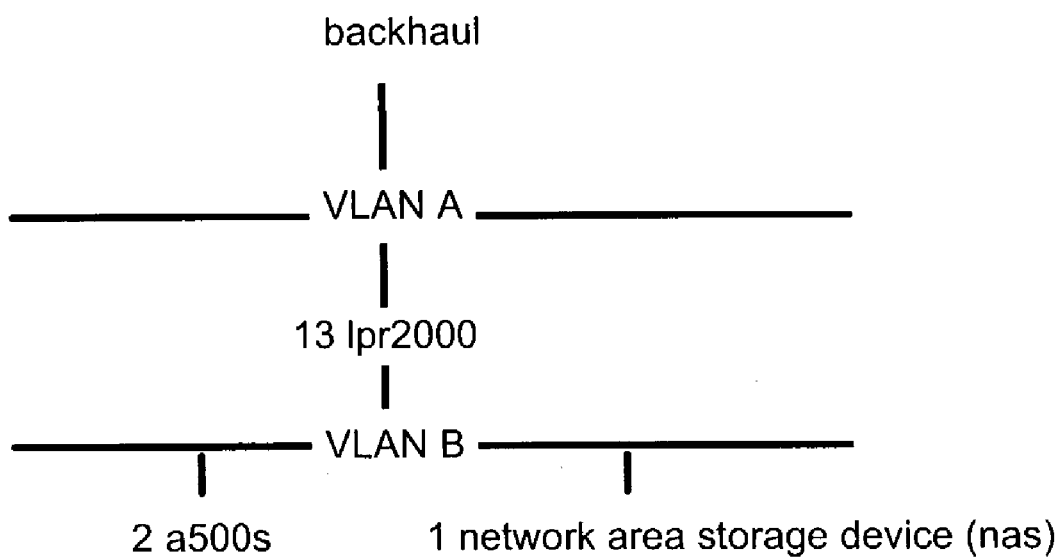
FIG. 2A illustrates an exemplary logical specification for a farm.

FIG. 7 shows the OVERLAY tree after the completion of the filter-by-switching-element process of FIG. 6. Note that redundant direct connect devices have been eliminated from the switching elements. For example, under switch 8101 of router 2024, the number of NAS has been reduced from 4 in FIGS. 5 to 1 in FIG. 7 since the logical specification of FIG. 2A only calls for 1 NAS. Analogously, under switch 8100 of router 2024, the number of VPN gateways (backhauls) has been reduced from 6 in FIGS. 5 to 1 in FIG. 7 since the logical specification of FIG. 2A only calls for 1 VPN gateway. Although there are many apparently redundant switches, some of which are better suited for constructing the farm than others, these are not eliminated in the filter-by-switching-element process of FIG. 6. These will be removed in subsequent filtering processes herein. Additionally, the numbers in parentheses next to the rooters (and hub) reflect the FREE devices associated with the rooters (and hub). For example, router 2021 can provide 13 LP2000R servers, while router 2024 can provide 13 LP2000R servers, 1 NAS device, and 1 backhaul device).

FIGS. 8A and 8B show, in accordance with one embodiment of the present invention, the filter-by-router process of block 306 of FIG. 3. Generally speaking, FIGS. 8A and 8B aim to either remove one or more switches under a router (FIG. 8A) or combine switches under a router to meet the needs of a particular device type (FIG. 8B). In FIG. 8A, it is ascertained in block 802 whether there are more rooters in the OVERLAY tree to process. If there are more rooters to process, the method proceeds to block 804 to begin processing the rooters one by one. Thus, in block 804, the temporary variable R is set to be the next router to initiate pass 1 over the children of router R. In the context of FIGS. 8A and 8B, pass 1 represents the processing of FIG. 8A to eliminate redundant switches. Pass 2 represents the processing of FIG. 8B to combine switches if needed.

In block 806, it is ascertained if there are more switch children under router R to process. If there are more switch children under router R to process, the method proceeds to block 808 wherein the temporary variable S is set to the next child switch of R. In step 810, it is ascertained whether the switch S has the bandwidth to handle the worst-case bandwidth demand, based on WORSTCASE(S) which was computed in block 616 of FIG. 6. This check ensures that a switch that is incapable of handling the worst-case bandwidth demand cannot "win" in a comparison with other switches for the purpose of eliminating redundant switches. Thus, if the switch S does not have the bandwidth to handle the worst-case bandwidth demand, the process returns to block 806 to process the next child switch of router R.

On the other hand, if switch S has the bandwidth left to handle the worst-case bandwidth demand, the method proceeds to block 812 wherein all other switch children of router R are stored in a list B. Thereafter, each child in list B is compared against switch S in order to determine whether the child in list B being compared can be safely eliminated. Thus, in block 814, it is ascertained whether there are more switches in list B to process. If there are no more switches in list B to process, the method returns to block 806 to process the next switch child of router R.

On the other hand, if there are more switches in list B to process, the method proceeds to block 816 wherein the temporary variable T is set to be the next switch in list B. In block 818, the test is performed to ascertain whether switch T can be eliminated. In one embodiment, switch T can be eliminated if both of the following two conditions are met. The first condition is met if switch S or switch T satisfies all needs for all device types that each has. The second condition is met if the number of free devices under switch S is greater than or equal to the number of free devices under switch T for all device types in T. For example, switch 8081 is identical (in terms of systems connected to it) to switch 8001 and switch 8135; however, none of them can eliminate the others because none of them meets the demand of 13 LP2000R servers.

If both conditions of block 818 are not met, the method returns to block 814 to process the next switch in list B. On the other hand, if both conditions of block 818 are met, the method proceeds to block 820 wherein switch T is removed from the OVERLAY tree. Thereafter, the method also returns to block 814 to process the next switch in list B.

If it is determined in block 806 that there are no more switch children of router R to process, the method proceeds to FIG. 8 to begin the pass 2 processing for the remaining children switches of router R.

In FIG. 8B, the goal is to combine switches under a router to meet a farm need if it is advantageous to do so. Thus in block 852, the list ListsbyType is initialized to null. Each list ListsbyType tracks, for a particular router, the MONOCHROME switches that supply a certain type of device. For example, under router 2023, switches 8085 and 8003 are both MONOCHROME switches that supply LP2000R servers. Furthermore, the variable Usablebytype is set to zero. The variable Usablebytype is used the track the number of devices of a particular type that a given switch can actually service. To clarify the difference between free and usable, consider the following example. A switch may have under it 12 free LP2000R servers but may have the bandwidth to service only 10. In that case, the Usablebytype for LP2000R for that switch is 10 even though there are 12 free LP2000R servers under it. The Usablebytype number is a more realistic assessment of a switch's capability with respect to a particular device type.

In block 854, it is ascertained whether there are more MONOCHROME switches left to process under router R. With respect to router 2024 from FIG. 7, for example, there are 3 MONOCHROME switches: 8004, 8005, and 8006. If there are, the loop from block 854 to block 856 will add up all the usable devices by type under the MONOCHROME switches and assign them to the variable Usablebytype. Thus, in this example, the number of Usablebytype for LP2000R servers under router 2024 will be 30 (since each of switches 8004, 8005, and 8006 has 10 usable LP2000R servers). Furthermore, the list ListsbyType will track, for router 2024, the three switches 8004, 8005, and 8006 as MONOCHROME switches that supply the LP2000R servers. This is shown in block 856.

If there are no MONOCHROME switches left to process, as determined by block 854, the method proceeds to block 858, which is a label or comment to indicate that the remaining steps deal primarily with filtering the MONOCHROME switches. In block 860, it is ascertained whether there are more non-empty ListsbyType to process. If there are more non-empty ListsbyType to process, the method proceeds to block 862.

With reference to the example dealing with router 2024, there is one non-empty ListsbyType (i.e., the one non-empty ListsbyType tracking the three MONOCHROME switches 8004, 8005, and 8006 that supply the LP2000R servers). Thus, in block 862, the temporary variable L is set to be the next MONOCHROME list. In the present example, the temporary variable L is set to the one non-empty ListsbyType that tracks the three MONOCHROME switches 8004, 8005, and 8006 that supply the LP2000R servers. In block 864, the process COMBINE is called upon to combine devices if appropriate. The COMBINE process of block 864 is discussed in connection with FIG. 9 herein. After the COMBINE process of FIG. 9 is completed, the method returns to block 860 to ascertain whether there are more non-empty ListsbyType to process. If there are no more non-empty ListsbyType to process, the method proceeds from block 860 of FIG. 8B to block 802 of FIG. 8A, block 806 to process the next router, if any.

FIG. 9 illustrates, in accordance with one embodiment of the present invention, the COMBINE process called by block 864 of FIG. 8B. In FIG. 9, the goal is in each router, the MONOCHROME switches that provide a certain device type are combined to create a larger logical switch servicing a larger number of devices of that type. In block 902, it is ascertained in block 902 wherein the device type allows self talk, i.e., devices of this type can communicate with one another. This parameter is supplied by the communication model and is tracked by variable SELFTALK earlier in block 412 of FIG. 4 if self talk is allowed. If self-talk is not allowed for this device type, as would be the case for the LP2000R servers of the present example, block 904 then lumps all devices of the type currently under consideration under a larger logical switch, up to the number of devices of this type that is needed by the farm.

In one embodiment, this is accomplished by copying the pointers to the devices and consolidating them under one of the switches (the exact choice of which switch is arbitrary since all similar devices under the same router are considered to have roughly the same communication cost). Also in block 904, all others devices of this type are removed, along with their parent switches. With respect to the example of FIG. 7, for example, the 36 non self-talk LP2000Rs under router 2024 are consolidated under a logical switch 8004, up to the 13 LP2000R servers required by the farm, and all other LP2000R devices, along with their parent switches (i.e., switches 8005 and 8006) are removed. Thereafter, the process of FIG. 9 ends to return to the calling process.

On the other hand, if self-talk is allowed for devices of this device type, the method proceeds to block 906 wherein a minimum set of switches is built, starting from the switch with the largest Usablebytype and recursively adding to the set the next largest Usablebytype switch until the number of required device by type is met. Initially, a quick check is made to ensure that the MONOCHROME switches in the ListsbyType of FIG. 8 can be pruned. Thus in block 906, it is ascertained whether the number of MONOCHROME switches in the ListsbyType list is at least 3. This is because at this point, no single MONOCHROME switch has all devices of the type to satisfy the need for that type and if there are only two or fewer MONOCHROME switches in the list, the MONOCHROME switches cannot be pruned. If there are more than two MONOCHROME switches and the Usablebytype value of all the MONOCHROME switches associated with the type in the list (i.e., the aggregate of Usablebytype parameters of all the MONOCHROME switches associated with the type) is greater than the required number of devices of the type, pruning is permissible. If pruning is not permissible, as ascertained by the test of block 906, the method proceeds to block 948 to return to the calling process.

If pruning is permissible, as ascertained by the test of block 906, the method proceeds from block 906 to block 908, wherein the temporary list SET is initialized to null and the SUM of Usablebytype values is zero for this temporary SET. In block 910, it is ascertained whether the current SUM of Usablebytype is less than the required number of devices of the type. If the current SUM of Usablebytype is less than the required number of devices, the switch G with the largest Usablebytype value that is not already in the temporary SET is added to the temporary SET, and the SUM of Usablebytype is updated by adding into the current SUM value the Usablebytype value of the newly added switch G. Thereafter, the method returns to block 910 to ascertain whether the current SUM of Usablebytype is still less than the required number of devices of the type and to add the switch with the next largest Usablebytype value to the temporary SET if it is ascertained in block 910 that the current SUM of Usablebytype is still less than the required number of devices of the type.

In this manner, the method builds up the temporary SET by accumulating switches, starting with the switch having the largest Usablebytype value first, until the total SUM of Usablebytype in the temporary SET is greater than or equal to the required number of devices by type. Once the total SUM of Usablebytype in the temporary SET is greater than or equal to the required number of devices, the method proceeds to block 912 to remove, for this router, all MONOCHROME switches associated with this type that have not been added to the temporary set. Thus, block 912 prunes all redundant switches once the combination has a sufficient number of Usablebytype to satisfy the farm need for the devices of the type.

FIG. 10 shows the OVERLAY tree after the completion of the filter-by-router process of FIGS. 8A and 8B and 9. Note that many switches have been eliminated from the rooters via simple elimination of redundant switches or via the combination of switches to meet the need by type and eliminating those MONOCHROME switches associated with the type that are not involved in the combination. For example, under router 2024, switch 8100 has been outright eliminated since switch 8101 can already offer all that switch 8100 can offer (i.e., 1 VPN gateway) and more. Switch 8101 is preferred and retained over switch 8100 since switch 8101 also offers an additional NAS. As another example, MONOCHROME switches 8005 and 8006 have been eliminated since the LP2000R servers can be logically consolidated under switch 8004'. Note that at this point, there are some redundant rooters (e.g., each of rooters 2011, 2012, and 2013 can offer the 2 required A500 servers and there is no need for all three of these rooters in the OVERLAY tree). The pruning of redundant rooters will be undertaken in the filter-by-hub process of FIGS. 1A and 1B herein.

Figure 11A:
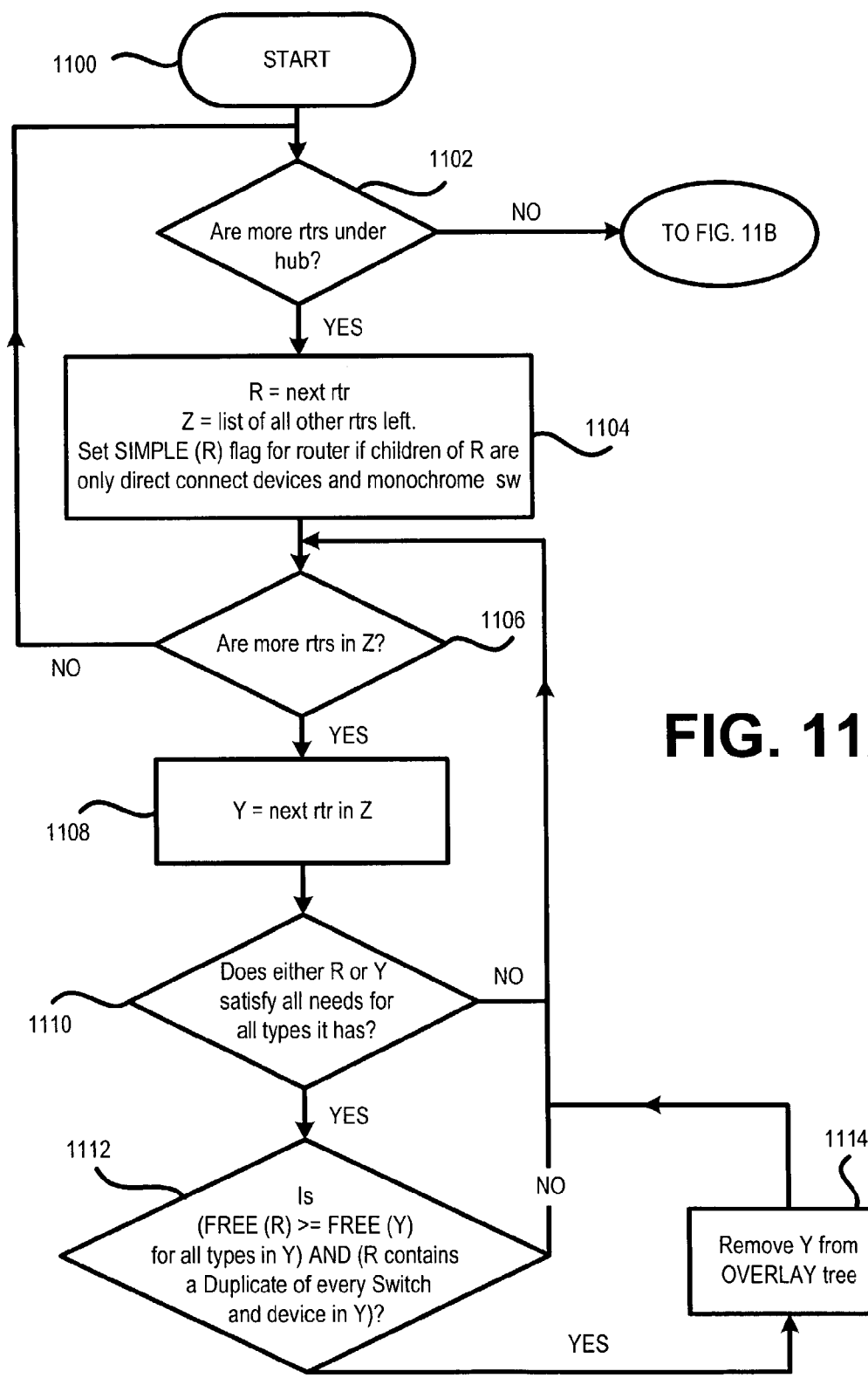
FIGS. 11A and 11B show, in accordance with one embodiment of the present invention, the filter-by-hub process.
Figure 11B:
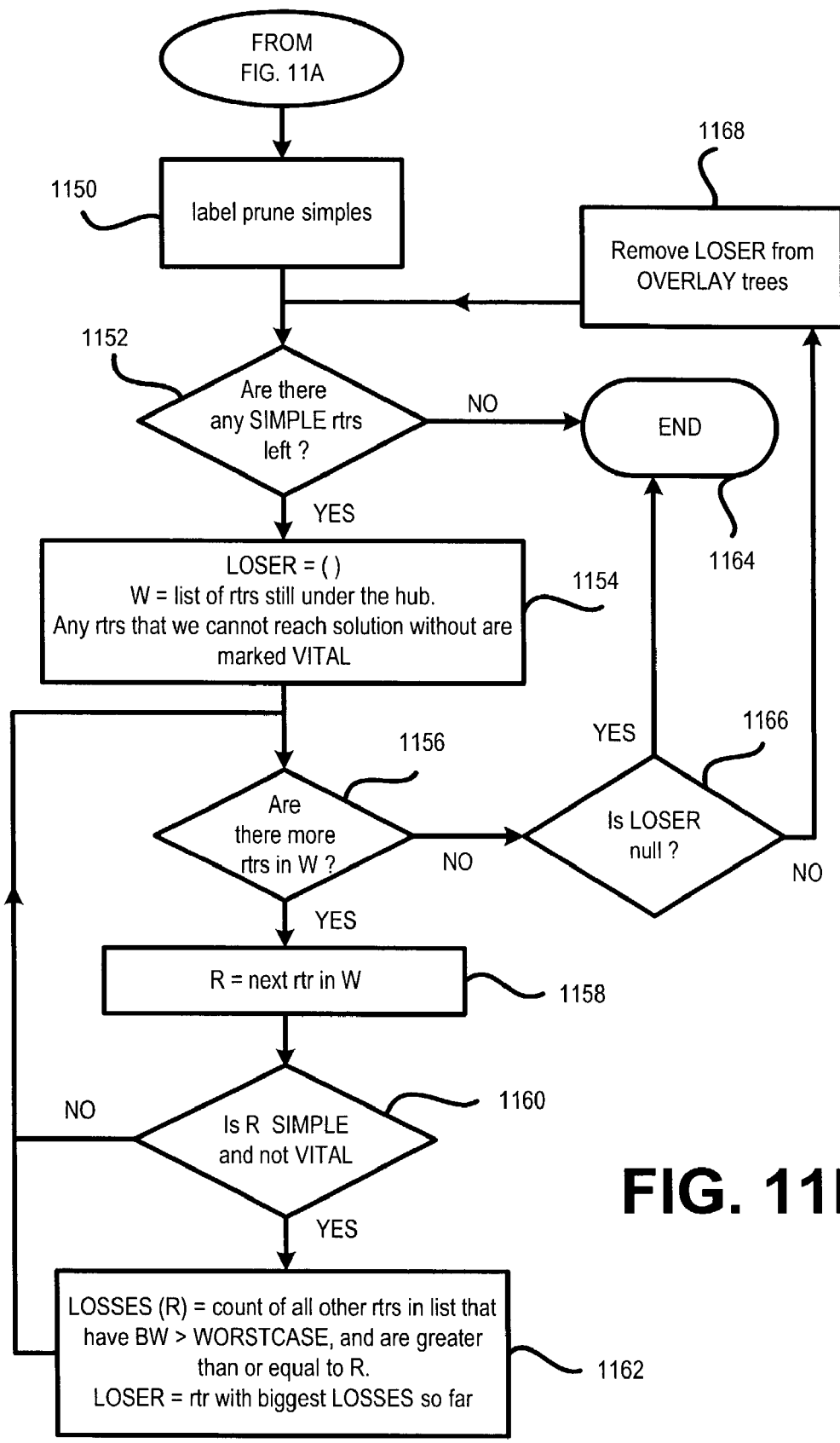

FIGS. 1A and 1B show, in accordance with one embodiment of the present invention, the filter-by-hub process of block 308 of FIG. 3. Generally speaking, FIGS. 11A and 1B aim to either remove one or more rooters under a hub (FIG. 1A) or combine rooters under a hub to meet the needs of a particular device type (FIG. 11B). In FIG. 11A, it is ascertained in block 1102 whether there are more rooters in the OVERLAY tree to process. If there are more rooters to process, the method proceeds to block 1104 to begin processing the rooters one by one. Thus, in block 1104, the temporary variable R is set to be the next router to initiate processing of the router children of the hub, and the list Z is set to be equal to all other remaining rooters of the hub. Furthermore, the flag SIMPLE(R) is set in the SIMPLE array for router R if all the children of router R are only direct connect devices and MONOCHROME switches. For example, with reference to FIG. 10, router 2024 would not have its SIMPLE flag set since switch 8101 is not a MONOCHROME switch. All other rooters under hub 1101 however are eligible to have their respective SIMPLE flags set. The SIMPLE flags for the rooters will be employed later in connection with FIG. 11B.

In block 1106, it is ascertained if there are more rooters in list Z to process. If there are more rooters in list Z to process, the method proceeds to block 1108 wherein the temporary variable Y is set to the next router in list Z. In step 1110, it is ascertained whether router R or router Y can satisfy all the needs for all devices types that each has. If not, the method returns to block 1106 to process the next router in list Z since router Y cannot be safely eliminated in this case. On the other hand, if either router R or router Y can satisfy all the needs for all devices types that each has, the method proceeds to block 1112 to ascertain whether router Y can be eliminated.

In block 1112, router Y is ascertained to be a candidate for elimination from the OVERLAY tree if both of the following two conditions are met. The first condition is met if the number of devices freely available in router R for constructing the farm is greater than or equal to the number of devices freely available for constructing the farm in router Y. The second condition is met if router R contains a duplicate of every devices and switching elements in router Y. If both conditions are met, the process proceeds from block 1112 to block 1114 wherein router Y is removed from the OVERLAY network. Thereafter, the process returns to block 1106 to process the next router in list Z. On the other hand, if both of two conditions are not met, the process returns from block 1112 to block 1106 to process the next router in list Z without eliminating router Y.

If all rooters in list Z are processed, the method returns to block 1102 to process the next router under the hub. Once all the rooters under the hub are processed, the method proceeds to FIG. 11B wherein unnecessary SIMPLE rooters are pruned to reduce redundancy in the OVERLAY tree.

Thus, with reference to the exemplary OVERLAY tree of FIG. 10, router 2011 will cause rooters 2012 and 2013 to be removed from the OVERLAY tree since the tests of blocks 1110 and 1112 are satisfied. Further, router 2021 will cause rooters 2022 and 2023 to be removed from the OVERLAY tree. Additionally, router 2024 in turn causes router 2021, which was the winning router earlier when router 2021 was compared against rooters 2022 and 2023, to be removed from the OVERLAY tree. In the end, only router 2011 and router 2024 remain. This is the result shown in FIG. 12, representing the filtered tree topology network.

FIG. 11B illustrates, in accordance with one embodiment of the present invention, the filter-by-hub process wherein unnecessary SIMPLE rooters are pruned to reduce redundancy in the OVERLAY tree. FIG. 11B may be invoked if, for example, after the filter-by-hub process of FIG. 11A, the OVERLAY tree still has five rooters, each of which has 1 A500 server. Although this is not the situation of the chosen example, such a situation may very well exist in some tree topology networks. Since the farm need for A500 servers is 2, and no single router in this particular example can supply two A500 servers, there is a need to eliminate the redundant rooters.

Block 1150 is a label or comment block to indicate that the process taken in FIG. 11B involves pruning SIMPLE rooters. It should be recalled that a router is deemed SIMPLE in block 1104 of FIG. 1A when all of its children are direct connect devices and MONOCHROME switches only (e.g., no non-MONOCHROME switch children). In block 1152, it is ascertained whether there are any SIMPLE rooters left in the OVERLAY tree after the filtering process of FIG. 11A is completed. If there are no SIMPLE rooters, the process of FIG. 1B ends since in this embodiment, only SIMPLE rooters are pruned.

If it is ascertained that there are SIMPLE rooters left to potentially prune in block 1152, the set LOSER is initialized to null and the temporary list variable W is set to be all the rooters still under the hub. Furthermore, any router or rooters that are required to reach the solution are marked with the flag VITAL in block 1154. For example, router 2024 is flagged as VITAL since it is needed for the NAS and backhaul.

Thereafter, the rooters in list W are processed one by one. In block 1156, it is ascertained whether there are additional rooters to be processed in list W using the logic in blocks 1158 and 1160. If it is ascertained in block 1156 that there are additional rooters to be processed, the method proceeds to block 1158 wherein the temporary variable R is set to be the next router in list W. In block 1160, router R is checked to ascertain if it is both SIMPLE and not VITAL. If router R is not ascertained to be both SIMPLE and not VITAL (i.e., the test of block 1156 fails), the method returns to block 1156 to process the next router in list W.

On the other hand, if router R is ascertained to be both SIMPLE and not VITAL, the method proceeds to block 1162 whereas the parameter LOS SES(R) is set to be the count of all other rooters in list W that both have the bandwidth greater than the WORSTCASE and have more devices than router R. The variable LOSER is set to be equal to the router with the biggest value for LOSSES so far. In essence, as the rooters of list W are processed in turn, blocks 1160 and 1162 ascertain the router with the least to offer and mark that router as the LOSER to be removed at a later time. Thereafter, the method returns to block 1156 to process other rooters in list W.

If all rooters in list W have been processed by blocks 1158, 1160 and/or 1162, the method proceeds from block 1156 to block 1166 to ascertain whether there is indeed a LOSER. If there is no loser (i.e., LOSER=null), no router can be eliminated and thus the process ends at block 1164. On the other hand, if block 1566 determines that there is indeed a LOSER, the router represented by LOSER is removed from the OVERLAY tree in block 1168. Thereafter, the method returns to block 1152 to recursively process the OVERLAY tree again to determine whether additional pruning is possible.

Once all SIMPLE rooters are processed, the method ends at block 1164. In the context of the present example, the process of FIG. 11B will result in 2 rooters remaining, each with one A500 server. The other three rooters having one A500 server each are pruned away leaving only the required 17 devices and 4 switches.

As can be appreciated from the foregoing, the invention efficiently filters the original tree topology network and obtains a filtered tree topology network (FTTN) that still contains the optimal solution or at least a solution substantially equal to the best solution obtainable from the unfiltered tree topology network. However, the resulting OVERLAY image has far fewer rooters, switches, and devices. In many cases, no further processing is needed since the filtered tree topology network itself is the solution (as in the case of FIG. 12 herein).

In one embodiment, the need-based filtering technique disclosed herein is employed in conjunction with an innovative technique for picking devices disclosed in a commonly-assigned, co-pending patent application entitled "SYSTEMS AND METHODS FOR RAPID SELECTION OF DEVICES IN A TREE TOPOLOGY NETWORK," which is filed on the same date by the inventors herein and incorporated by reference. Such a combination allows a highly efficient farm to be selected from a given tree topology network without consuming a large amount of time or undue computational resources. Even without utilizing the device selection technique disclosed in the aforementioned co-pending patent application, the need-based filtering techniques disclosed herein also makes any device selection technique more efficient since there are fewer rooters, switches, and devices to evaluate. This is because device selection methods usually require computation that varies in proportion to the square or the cube of the number of devices under consideration. Thus if the number of devices under consideration can be reduced by a factor of 10 using the present need-based filtering method before any device selection method is applied, the computation required for the device selection algorithm can be reduced by a factor of 100-1000.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method executable on at least one computer for causing said at least one computer to perform filtering, responsive to a logical specification of a network farm and a communication model for said farm, a tree topology network specification to obtain a filtered tree topology network specification, said filtered tree topology network specification having fewer devices therein relative to said tree topology network specification, devices needed for constructing said farm being available in said filtered tree topology network specification, said method comprising:

removing, using said at least one computer due to said method being executed on said at least one computer, a first set of devices and a first set of switching elements from said tree topology network specification starting at the lowest level of said tree topology network specification and working toward the root node of said tree topology network specification, each device in said first set of devices representing one of a redundant device, a device having a type unneeded by said farm, and a device unavailable for constructing said farm, each switching element in said first set of switching elements representing a switching element whose children devices are all members of said first set of devices.

2. The computer-implemented method of claim 1 wherein said removing comprises:

performing filter-by-device on said tree topology network specification to prune, at the lowest level of said tree topology network specification, a second set of devices, each device in said second set of devices representing one of a device having a type unneeded by said farm and a device unavailable for constructing said farm, thereby obtaining a post-filter-by-device tree topology network specification.

3. The computer-implemented method of claim 2 wherein said removing further comprises:

performing filter-by-switching-element on switching elements of said post-filter-by-device tree topology network specification to prune at each switching element of said post-filter-by-device tree topology network specification direct connect redundant devices, thereby obtaining a post-filter-by-switching-element tree topology network specification.

4. The computer-implemented method of claim 3 wherein said removing further comprises:

performing filter-by-router on rooters of said post-filter-by-switching-element tree topology network specification to prune at each router of said post-filter-by-switching-element tree topology network specification redundant switches, thereby obtaining a post-filter-by-router tree topology network specification.

5. The computer-implemented method of claim 4 wherein said performing filter-by-router further includes logically combining two switches associated with a router under consideration if both of said two switches only have under said both of said two switches devices of a given type and neither of said two switches, when considered individually, possesses a sufficient number of devices of said given type to satisfy the farm need for said given type.

6. The computer-implemented method of claim 4 wherein said removing further comprises:

performing filter-by-hub on a hub of said post-filter-by-router tree topology network specification to prune redundant rooters, thereby obtaining said filtered tree topology network specification.

7. The computer-implemented method of claim 6 wherein a first router is redundant to a second router if said second router has under said second router at least all devices that said first router has under said first router.

8. An article of manufacture comprising a program storage medium having computer readable codes embodied therein, said computer readable codes being configured, when executed on at least one computer for causing said at least one computer to perform filtering, responsive to a logical specification of a network farm and a communication model for said farm, a tree topology network specification to obtain a filtered tree topology network specification, said filtered tree topology network specification having fewer devices therein relative to said tree topology network specification, devices needed for constructing said farm being available in said filtered tree topology network specification, said computer readable codes comprising:

computer readable codes for removing a first set of devices and a first set of switching elements from said tree topology network specification starting at the lowest level of said tree topology network specification and working toward the root node of said tree topology network specification, each device in said first set of devices representing one of a redundant device, a device having a type unneeded by said farm, and a device unavailable for constructing said farm, each switching element in said first set of switching elements representing a switching element whose children devices are all members of said first set of devices.

9. The article of manufacture of claim 8 wherein computer readable codes implementing said removing comprises:
computer readable codes for performing filter-by-device on said tree topology network specification to prune, at the lowest level of said tree topology network specification, a second set of devices, each device in said second set of devices representing one of device having a type unneeded by said farm and a device unavailable for constructing said farm, thereby obtaining a post-filter-by-device tree topology network specification.

10. The article of manufacture of claim 9 wherein said computer readable codes implementing said removing further comprises:
computer readable codes for performing filter-by-switching-element on switching elements of said post-filter-by-device tree topology network specification to prune at each switching element of said post-filter-by-device tree topology network specification direct connect redundant devices, thereby obtaining a post-filter-by-switching-element tree topology network specification.

11. The article of manufacture of claim 10 wherein said computer readable codes implementing said removing further comprises:
computer readable codes for performing filter-by-router on rooters of said post-filter-by-switching-element tree topology network specification to prune at each router of said post-filter-by-switching-element tree topology network specification redundant switches, thereby obtaining a post-filter-by-router tree topology network specification.

12. The article of manufacture of claim 11 wherein computer readable codes for performing filter-by-router further includes computer readable codes for logically combining two switches associated with a router under consideration if both of said two switches only have under said both of said two switches devices of a given type and neither of said two switches, when considered individually, possesses a sufficient number of devices of said given type to satisfy the farm need for said given type.

13. The article of manufacture of claim 11 wherein said computer readable codes implementing said removing further comprises:
computer readable codes for performing filter-by-hub on a hub of said post-filter-by-router tree topology network specification to prune redundant rooters, thereby obtaining said filtered tree topology network specification.

14. A computer-implemented method executable on at least one computer for causing said at least one computer to perform filtering, responsive to a logical specification of a network farm and a communication model for said farm, a tree topology network specification to obtain a filtered tree topology network specification, said filtered tree topology network specification having fewer devices therein relative to said tree topology network specification, devices needed for constructing said farm being available in said filtered tree topology network specification, said method comprising:
performing, using said at least one computer due to said method being executed on said at least one computer, filter-by-device on said tree topology network specification to prune, at the lowest level of said tree topology network specification, a first set of devices, each device in said first set of devices representing one of device having a type unneeded by said farm and a device unavailable for constructing said farm, thereby obtaining a post-filter-by-device tree topology network specification;
performing filter-by-switching-element on switching elements of said post-filter-by-device tree topology network specification to prune at each switching element of said post-filter-by-device tree topology network specification direct connect redundant devices, thereby obtaining a post-filter-by-switching-element tree topology network specification, at least one switching element represents one of a switch, a router, and a hub;
performing filter-by-router on rooters of said post-filter-by-switching-element tree topology network specification to prune at each router of said post-filter-by-switching-element tree topology network specification redundant switches, thereby obtaining a post-filter-by-router tree topology network specification; and
performing filter-by-hub on a hub of said post-filter-by-router tree topology network specification to prune redundant rooters, thereby obtaining said filtered tree topology network specification.

15. The computer-implemented method of claim 14 wherein said performing filter-by-router includes logically combining two switches associated with a router under consideration if both of said two switches only have under said both of said two switches devices of a given type and neither of said two switches, when considered individually, possesses a sufficient number of devices of said given type to satisfy the farm need for said given type.

16. An arrangement for creating a network farm that conforms to a furnished logical specification and a furnished communication model for said farm, said logical specification specifying types of device required by said farm and a number of devices of each of said types of device required by said farm, said communication model specifying bandwidth utilization of each type of device in said farm, comprising:
a tree topology network having therein devices and switching elements arranged in a tree topology; and
a computing apparatus executing computer-readable codes for filtering, responsive to said logical specification and said communication model for said farm, a tree topology network specification of said tree topology network to obtain a filtered tree topology network specification, said filtered tree topology network specification having fewer devices therein relative to said tree topology network specification, devices needed for constructing said farm being available in said filtered tree topology network specification, computer readable codes for said filtering includes computer readable codes for removing a first set of devices and a first set of switching elements from said tree topology network specification starting at the lowest level of said tree topology network specification and working toward the root node of said tree topology network specification, each device in said first set of devices representing one of a redundant device, a device having a type unneeded by said farm, and a device unavailable for constructing said farm, each switching element in said first set of switching elements representing a switching element whose children devices are all members of said first set of devices.

17. The arrangement of claim 16 wherein said computer readable codes for removing comprises:
   computer readable codes for performing filter-by-device on said tree topology network specification to prune, at the lowest level of said tree topology network specification, a second set of devices, each device in said second set of devices representing one of device having a type unneeded by said farm and a device unavailable for constructing said farm, thereby obtaining a post-filter-by-device tree topology network specification.

18. The arrangement of claim 17 wherein said computer readable codes for removing further comprises:
   computer readable codes for performing filter-by-switching-element on switching elements of said post-filter-by-device tree topology network specification to prune at each switching element of said post-filter-by-device tree topology network specification direct connect redundant devices, thereby obtaining a post-filter-by-switching-element tree topology network specification.

19. The arrangement of claim 18 wherein said computer readable codes for removing further comprises:
   computer readable codes for performing filter-by-router on rooters of said post-filter-by-switching-element tree topology network specification to prune at each router of said post-filter-by-switching-element tree topology network specification redundant switches, thereby obtaining a post-filter-by-router tree topology network specification.

20. The arrangement of claim 19 wherein said computer readable codes for performing filter-by-router further includes logically combining two switches associated with a router under consideration if both of said two switches only have under said both of said two switches devices of a given type and neither of said two switches, when considered individually, possesses a sufficient number of devices of said given type to satisfy the farm need for said given type.

21. The arrangement of claim 19 wherein said computer readable codes for removing further comprises:
   computer readable codes for performing filter-by-hub on a hub of said post-filter-by-router tree topology network specification to prune redundant rooters, thereby obtaining said filtered tree topology network specification.

* * * * *

UNITED STATES PATENT AND TRADEMARK OFFICE
CERTIFICATE OF CORRECTION

```
PATENT NO.        : 7,313,101 B2
APPLICATION NO.   : 10/327335
DATED             : December 25, 2007
INVENTOR(S)       : Scott Alan Rhine et al.
```

It is certified that error appears in the above-identified patent and that said Letters Patent is hereby corrected as shown below:

Column 1, line 9, delete "rooters" and insert -- routers --, therefor.

Column 1, line 36, delete "rooters" and insert -- routers --, therefor.

Column 1, line 45, delete "rooters" and insert -- routers --, therefor.

Column 2, line 4, delete "rooters" and insert -- routers --, therefor.

Column 2, line 16, delete "rooters" and insert -- routers --, therefor.

Column 5, line 4, delete "rooters" and insert -- routers --, therefor.

Column 5, line 11, delete "rooters" and insert -- routers --, therefor.

Column 6, line 42, delete "rooters" and insert -- routers --, therefor.

Column 7, line 17, delete "rooters" and insert -- routers --, therefor.

Column 7, line 52, delete "rooters" and insert -- routers --, therefor.

Column 8, line 2, delete "rooters" and insert -- routers --, therefor.

Column 8, line 5, delete "rooters" and insert -- routers --, therefor.

Column 8, line 9, delete "rooters" and insert -- routers --, therefor.

Column 8, line 17, delete "rooters" and insert -- routers --, therefor.

Column 9, line 40, delete "rooters" and insert -- routers --, therefor.

Column 9, line 41, delete "rooters" and insert -- routers --, therefor.

Column 9, line 51, delete "rooters" and insert -- routers --, therefor.

Column 9, line 52, delete "rooters" and insert -- routers --, therefor.

Column 9, line 54, delete "rooters" and insert -- routers --, therefor.

UNITED STATES PATENT AND TRADEMARK OFFICE
CERTIFICATE OF CORRECTION

| | |
|---|---|
| PATENT NO. | : 7,313,101 B2 |
| APPLICATION NO. | : 10/327335 |
| DATED | : December 25, 2007 |
| INVENTOR(S) | : Scott Alan Rhine et al. |

It is certified that error appears in the above-identified patent and that said Letters Patent is hereby corrected as shown below:

Column 12, line 52, delete "rooters" and insert -- routers --, therefor.

Column 12, line 65, after "redundant" delete "rooters" and insert -- routers --, therefor.

Column 12, line 65, after "each of" delete "rooters" and insert -- routers --, therefor.

Column 12, line 67, delete "rooters" and insert -- routers --, therefor.

Column 13, line 1, delete "rooters" and insert -- routers --, therefor.

Column 13, line 2, delete "1A" and insert -- 11A --, therefor.

Column 13, line 2, delete "1B" and insert -- 11B --, therefor.

Column 13, line 3, delete "1A" and insert -- 11A --, therefor.

Column 13, line 3, delete "1B" and insert -- 11B --, therefor.

Column 13, line 5, delete "1B" and insert -- 11B --, therefor.

Column 13, line 6, delete "rooters" and insert -- routers --, therefor.

Column 13, line 7, delete "1A" and insert -- 11A --, therefor.

Column 13, line 7, delete "rooters" and insert -- routers --, therefor.

Column 13, line 9, delete "rooters" and insert -- routers --, therefor.

Column 13, line 10, delete "rooters" and insert -- routers --, therefor.

Column 13, line 12, delete "rooters" and insert -- routers --, therefor.

Column 13, line 15, delete "rooters" and insert -- routers --, therefor.

Column 13, line 21, delete "rooters" and insert -- routers --, therefor.

Column 13, line 23, delete "rooters" and insert -- routers --, therefor.

Column 13, line 25, delete "rooters" and insert -- routers --, therefor.

UNITED STATES PATENT AND TRADEMARK OFFICE
CERTIFICATE OF CORRECTION

| | |
|---|---|
| PATENT NO. | : 7,313,101 B2 |
| APPLICATION NO. | : 10/327335 |
| DATED | : December 25, 2007 |
| INVENTOR(S) | : Scott Alan Rhine et al. |

It is certified that error appears in the above-identified patent and that said Letters Patent is hereby corrected as shown below:

Column 13, line 26, delete "rooters" and insert -- routers --, therefor.

Column 13, line 52, delete "rooters" and insert -- routers --, therefor.

Column 13, line 54, delete "rooters" and insert -- routers --, therefor.

Column 13, line 55, delete "rooters" and insert -- routers --, therefor.

Column 13, line 58, delete "rooters" and insert -- routers --, therefor.

Column 13, line 61, delete "rooters" and insert -- routers --, therefor.

Column 13, line 64, delete "rooters" and insert -- routers --, therefor.

Column 14, line 3, delete "rooters" and insert -- routers --, therefor.

Column 14, line 6, delete "rooters" and insert -- routers --, therefor.

Column 14, line 12, delete "rooters" and insert -- routers --, therefor.

Column 14, line 15, delete "rooters" and insert -- routers --, therefor.

Column 14, line 16, delete "1A" and insert -- 11A --, therefor.

Column 14, line 20, delete "rooters" and insert -- routers --, therefor.

Column 14, line 21, delete "rooters" and insert -- routers --, therefor.

Column 14, line 22, delete "1B" and insert -- 11B --, therefor.

Column 14, line 23, delete "rooters" and insert -- routers --, therefor.

Column 14, line 24, delete "rooters" and insert -- routers --, therefor.

Column 14, line 27, delete "rooters" and insert -- routers --, therefor.

Column 14, line 28, delete "rooters" and insert -- routers --, therefor.

Column 14, line 32, delete "rooters" and insert -- routers --, therefor.

UNITED STATES PATENT AND TRADEMARK OFFICE
CERTIFICATE OF CORRECTION

| | | |
|---|---|---|
| PATENT NO. | : 7,313,101 B2 | |
| APPLICATION NO. | : 10/327335 | |
| DATED | : December 25, 2007 | |
| INVENTOR(S) | : Scott Alan Rhine et al. | |

It is certified that error appears in the above-identified patent and that said Letters Patent is hereby corrected as shown below:

Column 14, line 34, delete "rooters" and insert -- routers --, therefor.

Column 14, line 36, delete "rooters" and insert -- routers --, therefor.

Column 14, line 46, delete "rooters" and insert -- routers --, therefor.

Column 14, line 50, delete "rooters" and insert -- routers --, therefor.

Column 14, line 54, delete "rooters" and insert -- routers --, therefor.

Column 14, line 55, delete "rooters" and insert -- routers --, therefor.

Column 14, line 66, delete "rooters" and insert -- routers --, therefor.

Column 15, line 1, delete "rooters" and insert -- routers --, therefor.

Column 15, line 2, delete "rooters" and insert -- routers --, therefor.

Column 15, line 11, delete "rooters" and insert -- routers --, therefor.

Column 15, line 30, delete "rooters" and insert -- routers --, therefor.

Column 16, line 26, in Claim 4, delete "rooters" and insert -- routers --, therefor.

Column 16, line 44, in Claim 6, delete "rooters" and insert -- routers --, therefor.

Column 17, line 32, in Claim 11, delete "rooters" and insert -- routers --, therefor.

Column 17, line 52, in Claim 13, delete "rooters" and insert -- routers --, therefor.

Column 18, line 16, in Claim 14, delete "rooters" and insert -- routers --, therefor.

Column 18, line 24, in Claim 14, delete "rooters" and insert -- routers --, therefor.

Column 19, line 23, in Claim 19, delete "rooters" and insert -- routers --, therefor.

UNITED STATES PATENT AND TRADEMARK OFFICE
CERTIFICATE OF CORRECTION

| | |
|---|---|
| PATENT NO. | : 7,313,101 B2 |
| APPLICATION NO. | : 10/327335 |
| DATED | : December 25, 2007 |
| INVENTOR(S) | : Scott Alan Rhine et al. |

It is certified that error appears in the above-identified patent and that said Letters Patent is hereby corrected as shown below:

Column 20, line 19, in Claim 21, delete "rooters" and insert -- routers --, therefor.

Signed and Sealed this

Tenth Day of June, 2008

JON W. DUDAS
*Director of the United States Patent and Trademark Office*